United States Patent
Kataoka

(10) Patent No.: US 6,903,796 B2
(45) Date of Patent: Jun. 7, 2005

(54) LIQUID CRYSTAL DISPLAY DEVICE USING PHOTO-CURED PRODUCT FORMED OF PHOTO-CURING COMPOSITION HAVING LIQUID CRYSTAL SKELETAL STRUCTURE AND PRODUCTION METHOD THEREOF

(75) Inventor: Shingo Kataoka, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 200 days.

(21) Appl. No.: 09/898,340

(22) Filed: Jul. 3, 2001

(65) Prior Publication Data

US 2002/0021401 A1 Feb. 21, 2002

(30) Foreign Application Priority Data

Jul. 7, 2000 (JP) ........................................ 2000-207212

(51) Int. Cl.[7] ........................ C09K 19/02; G02F 1/1337
(52) U.S. Cl. ........................ 349/178; 349/129; 349/130; 349/186; 252/299.1
(58) Field of Search ................................ 349/123, 129, 349/178, 130, 144, 177, 186; 252/299.1, 299.6

(56) References Cited

U.S. PATENT DOCUMENTS

| | | | | |
|---|---|---|---|---|
| 4,834,509 A | * | 5/1989 | Gunjima et al. | 349/89 |
| 5,825,445 A | * | 10/1998 | Okamoto et al. | 349/118 |
| 6,043,860 A | * | 3/2000 | Wei et al. | 349/187 |
| 6,061,116 A | * | 5/2000 | Nishida et al. | 349/130 |
| 6,072,553 A | * | 6/2000 | Mitsui et al. | 349/113 |
| 6,221,444 B1 | * | 4/2001 | Okada et al. | 428/1.25 |
| 6,256,082 B1 | | 7/2001 | Suzuki et al. | 349/144 |
| 6,395,352 B1 | * | 5/2002 | Mochizuki et al. | 428/1.1 |
| 6,469,762 B1 | * | 10/2002 | Hong et al. | 349/123 |

FOREIGN PATENT DOCUMENTS

JP          07-110469 A   *  4/1995

OTHER PUBLICATIONS

Konno et al.; S23–2 OCB–Cell using Polymer Stabilized Bend Alignment; Asia Display; Oct. 16, 1995; pp. 581–583.
Hasebe et al; Effect of Polymer Network made of Liquid Crystalline Diacrylate on Characteristics of Liquid Crystal Display Device; Japanese Journal of Applied Physics, Publication Office Japanese Journal of Applied Physics; Tokyo, Japan; vol. 33, No. 11; Nov. 1, 1994; pp. 6245–6248.
Ingo Dierking; Polymer Network–Stabilized Liquid Crystals; Advanced Materials; VCH Verlagsgesellschaft, Weinheim, DE; vol. 12, No. 3; Feb. 3, 2000; pp. 167–181.

* cited by examiner

Primary Examiner—Tarifur R. Chowdhury
(74) Attorney, Agent, or Firm—Greer, Burns & Crain, Ltd.

(57) ABSTRACT

In an MVA mode liquid crystal display device, a concentration of a photo-cured product by a photo-curing composition having a liquid skeletal structure for liquid crystal molecules upon spray or bend deformation is set to 0.3 to 3 wt %. The liquid crystal skeletal structure is formed under the tilt state to substrates, and a mean tilt angle of the liquid crystal molecules falls within a range defined by a polar angle of the liquid crystal skeletal structure and a pre-tilt angle of the liquid crystal molecules in the proximity of the substrate interface.

8 Claims, 7 Drawing Sheets

WITHOUT APPLICATION OF VOLTAGE BETWEEN ELECTRODES

WITH APPLICATION OF VOLTAGE

DIRECTION
OF DOMAINS

BEFORE VOLTAGE APPLICATION

AFTER PASSAGE OF PREDETERMINED
TIME FROM VOLTAGE APPLICATION

LIQUID CRYSTAL DISPLAY DEVICE USING PHOTO-CURED PRODUCT FORMED OF PHOTO-CURING COMPOSITION HAVING LIQUID CRYSTAL SKELETAL STRUCTURE AND PRODUCTION METHOD THEREOF

BACKGROUND OF THE INVENTION

1. Field of the Invention

This invention relates to a liquid crystal display device of an MVA mode that controls an alignment direction of liquid crystal molecules by utilizing protrusive structures disposed on a substrate surface or non-electrode regions (slits) of each transparent pixel electrode, and a liquid crystal display device that regulates an alignment direction of liquid crystal molecules by using a photo-cured product formed of a photo-curing composition having a liquid crystal skeletal structure.

2. Description of the Related Art

A liquid crystal display device has been utilized not only for mobile application such as notebook type personal computers and portable information terminals but also for desktop type computers and television monitors to satisfy social requirements for space saving and energy saving. Performance of the liquid crystal display device has been drawn into comparison with that of CRT monitors. Development has been made to improve performance of the liquid crystal display device to the level of performance of the CRT monitors.

The CRT monitor makes use of light emission of a fluorescent material and has low angle dependence. Its viewing angle is wide. On the other hand, the liquid crystal display device electrically controls alignment directions of the liquid crystal molecules when the rays of light from a light source transmit through a liquid crystal layer to change a transmission and to display images. Even though contrast in a vertical direction to a screen can be satisfied, the liquid crystal display device has large viewing angle dependence such that contrast is small when viewed from an oblique direction and chromatic inversion develops.

For example, a liquid crystal display device of a twisted nematic (TN) mode, in which molecules of a liquid crystal material having positive dielectric anisotropy is arranged horizontally to a substrate surface and is twisted 90 degrees between opposing substrates, has been widely utilized as a liquid crystal display (LCD) using an active matrix. The greatest drawback of this TN mode LCD is that the viewing angle is small. Various studies have therefore been made to improve this viewing angle characteristic.

For example, an MVA (Multi-domain Vertical Alignment) mode is known that divides one pixel into multiple domains and disperses the alignment direction for each domain to enlarge the viewing angle of one pixel as a whole.

FIG. 3 is a conceptual view of the MVA mode liquid crystal display device. Reference numerals 21 and 22 denote upper and lower glass substrates. Reference numerals 61 and 62 denote protrusive structures formed on these substrates, respectively. Reference numeral 5 denotes liquid crystal molecules. Besides these members, the liquid crystal display further includes transparent electrodes, alignment films, thin film transistors (TFT), phase difference films, and the like, that are not shown in the drawing.

When a liquid crystal material having negative dielectric anisotropy is sealed between two glass substrates, the liquid crystal molecules are aligned substantially vertically by the force of regulation of the alignment film. Pixel electrodes connected to TFT are formed on one of the glass substrates, and a common electrode is formed on the other glass substrate. The protrusive structures are alternately arranged on the pixel electrodes and on the common electrode.

When TFT is OFF state, the liquid crystal molecules in the gap region between the protrusive structures is aligned in the substantial vertical direction to the interfaces of the substrates, and the liquid crystal molecules in the proximity of each protrusive structure are aligned in the direction vertical to a slope.

When TFT is turned OFF state, an electric field is applied to the liquid crystal, and the liquid crystal molecules are about to turn down from the direction vertical to the substrate. Due to the inclination of the protrusive structures, however, the liquid crystal molecules are regulated to the turn-down direction of the liquid crystal molecules that have turned down from the beginning, so that inclination propagates to the liquid crystal molecules in the gap region.

FIG. 4 shows the inclining direction of the liquid crystal molecules inside one pixel of the MVA mode liquid crystal display device. Reference numerals 61 and 62 denote the protrusive structures disposed on the upper and lower substrates. Reference numeral 7 denotes pixel electrodes disposed on the lower substrate. Each pixel is divided into three longitudinally elongated regions of red, green and blue. The directions of the protrusive structures 61 and 62 are bent 90 degrees inside each pixel.

In this structural example, the gap region of the protrusive structures disposed on the upper and lower substrates is divided into four domains A, B, C and D. The alignment directions of the liquid crystal molecules in each domain are mutually different by 90 degrees. In the MVA mode liquid crystal display device, the liquid crystal molecules are aligned in a plurality of directions when TFT is turned OFF as described above. Therefore, the viewing angle can be broadened.

The MVA mode liquid crystal display device involves the problem that its response at a half tone is relatively slow. In the MVA mode, the protrusive structures and the slits formed on the substrate surface regulate the inclining alignment of the liquid crystal molecules. Therefore, the switching operation of the liquid crystal molecules is conducted in the form of a propagation process of inclining alignment of the liquid crystal molecules from near the structures to the gap portions.

FIG. 5 shows the mode of propagation of the inclination of the liquid crystal molecules having negative dielectric anisotropy. Reference numeral 6 in the drawing denotes the protrusive structure, and the other reference numerals have the same meaning as those shown in FIG. 3. The upper part of this drawing shows the initial alignment condition of the liquid crystal molecules. The lower part of this drawing shows the state after the passage of a predetermined time from the timing at which a voltage is applied step-wise to the members 21 and 22.

At first, the liquid crystal molecules near the protrusive structure are subjected to the influences of the voltage change, and their tilt angle becomes great. Because of this change, the liquid crystal molecules that do not keep contact with the protrusive structure and exist in the proximity of the inclined liquid crystal molecules are turned down, and this inclination sequentially propagates. Solid line in the drawing represents the inclination state at the final stage. Dotted line represents the half tone having a small application voltage. Since the force of regulation by the electric field is small, too, a long time is necessary before propagation to the liquid crystal molecules of the whole region is complete. This is the greatest reason why the response of the MVA mode at the half tone is slow.

SUMMARY OF THE INVENTION

The object of the present invention is to provide a liquid crystal display device, in particular the MVA mode liquid crystal display device, exhibiting high-speed response characteristic in the whole gradations by simultaneously inclining the alignment of the liquid crystal molecules throughout the whole display regions at the time of the switching operation, and improving the response of the liquid crystal molecules themselves to the electric field.

The object can be attained by a liquid crystal display device which comprises a pair of substrates including a first substrate having pixel electrodes, active devices and an alignment film, and a second substrate having an opposing electrode and an alignment film; and a liquid crystal layer containing nematic liquid crystal molecules and a cured-product formed three-dimensionally of a composition having a liquid crystal skeletal structure, and sandwiched between the pair of substrates; wherein deformation of the liquid crystal layer is at least spray deformation or bend deformation.

DETAILED DESCRIPTION OF THE PREFERRED EMBODIMENTS

Figure 1:
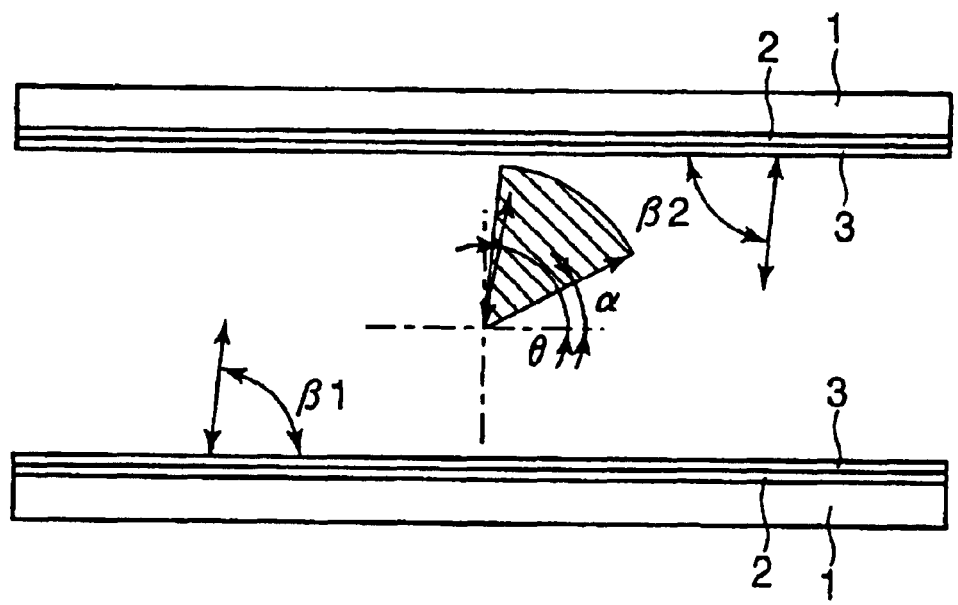
FIG. 1 shows an alignment direction of liquid crystal molecules in the present invention.
Figure 1:
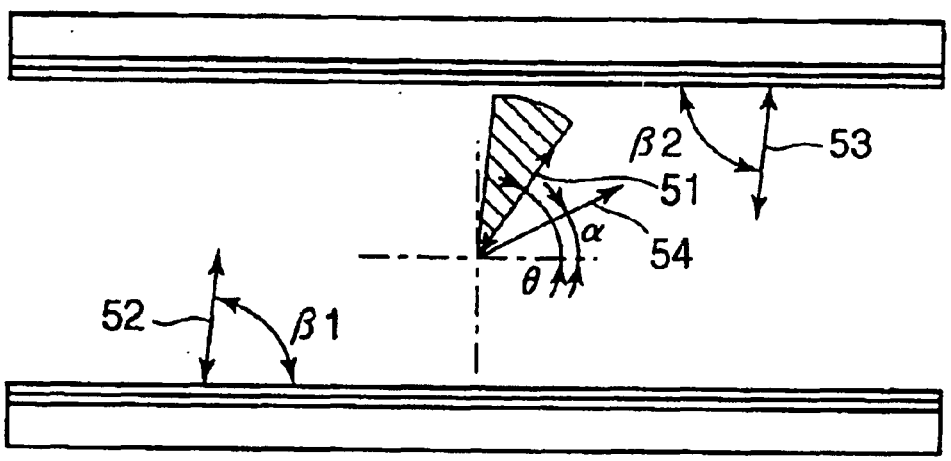

FIG. 1 shows the principle of the present invention. In the drawing, reference numeral 1 denotes glass substrates. Reference numeral 2 denotes electrodes. Reference numeral 3 denotes alignment films. Reference numeral 51 denotes a mean major axis direction of all liquid crystal molecules. Reference numerals 52 and 53 denote the major axis direction of the liquid crystal molecules regulated by the alignment films 3 in the proximity of the surfaces of the first and second glass substrates. Reference numeral 54 represents a mean polar angle direction of the liquid crystal skeletal structures. When the liquid crystal molecules receive only the force of regulation of the alignment film, the whole liquid crystal molecules are aligned on an average in a direction as the average of two pre-tilt angles.

When the liquid crystal skeletal structure is added, however, the combined force of the force of regulation of the alignment film and the force of regulation of the liquid crystal skeletal structure operates with the result that the liquid crystal molecules are inclined. At this time, the liquid crystal molecules are inclined within the range represented by slant lines at the time when no voltage is applied. The degree of this inclination can be arbitrarily changed by means of the proportion of the liquid crystal skeletal structure to the liquid crystal and the size of the tilt angle of the liquid crystal skeletal structure.

At this time, the force that is to incline the liquid crystal molecules to the alignment direction of the liquid crystal skeletal structure exists. Therefore, switching at a higher speed than under the state where the liquid crystal molecules are inclined and aligned on the interface such as by rubbing means becomes possible.

When the attraction force of the liquid crystal skeletal structure to the liquid crystal molecules is excessively strong, however, the liquid crystal molecules are aligned in the same direction as the liquid crystal skeletal structure and restriction of the inclination at the time of the voltage application becomes so great that characteristics (such as the contrast ratio) are lowered, on the contrary.

In other words, when a mean tilt angle between the liquid crystal skeletal structure and the glass substrate surface in the polar angle direction is $\alpha$, one of the pre-tilt angles of the liquid crystal molecules on the upper and lower substrate surfaces is $\beta 1$ and the other is $\beta 2$, the mean tilt angle of the liquid crystal molecules is $\theta$. The following relation is satisfied:

when no-voltage is applied; and (1) When dielectric anisotropy of liquid crystal molecule is negative:

$$\alpha<\theta<(\beta 1+\beta 2)/2$$

(2) When dielectric anisotropy of liquid crystal molecule is positive:

$$(\beta 1+\beta 2)/2<\theta<\alpha$$

For example, the range is represented by slant line in the upper-side of FIG. 1 when dielectric anisotropy is negative. From the aspects of viewing angle characteristics and response characteristics, it is very important that deformation of the liquid crystal layer during driving is primarily the mode utilizing spray or bent.

At this time, the following condition may be considered. Namely, when a concentration of a photo-cured product of a photo-curing composition having a liquid crystal skeletal structure in the liquid crystal layer is from 0.3 to 3 wt %, a voltage above a threshold voltage is applied to the liquid crystal layer and the tilt angle of the liquid crystal skeletal structure is fixed while the rays of light are being irradiated under the state where the liquid crystal layer is deformed. It is preferred in this case to align the liquid crystal molecules and the liquid crystal skeletal structures so as to satisfy the following relation:

(3) When dielectric anisotropy of liquid crystal molecule is negative:

$$(\beta 1+\beta 2)/2-\theta<\theta-\alpha$$

(4) When dielectric anisotropy of liquid crystal molecule is positive:

$$\theta-(\beta 1+\beta 2)/2<\alpha-\theta$$

For example, the range is represented by the slant line in the lower-side of FIG. 1 when dielectric anisotropy is negative. The concentration of the photo-cured product of the photo-curing composition having the liquid crystal skeletal structure is preferably from 0.3 to 3 wt %, most preferably from 1.0 to 2.0 wt %.

Incidentally, the present invention applies the initial inclination not only to the substrate interface but also to the whole bulk of the liquid crystal layer, and can control the inclination to an arbitrary tilt angle. Therefore, the present invention can acquire an improving effect for the system that applies alignment control such as rubbing.

The inventor of this invention has found that a drastic improvement of the response speed by simultaneous inclination of the whole surface can be accomplished by forming the photo-cured product of the photo-curing composition having the skeletal structure in the liquid crystal layer under the state where the liquid crystal skeletal structure is inclined to the substrates.

In the liquid crystal display device according to the embodiment, 0.3 to 3 wt % of a photo-curing composition having a liquid crystal skeletal structure is added to a nematic liquid crystal layer, and photo-polymerization is carried out to form a photo-cured product while the liquid crystal skeletal structure is kept inclined in a predetermined direction. Deformation of the liquid crystal layer is limited to spray deformation or bend deformation.

In the present embodiment, the liquid crystal skeletal structure imparts a predetermined alignment tilt angle to the liquid crystal molecules in the proximity thereof. Therefore, when a display signal voltage is applied to the liquid crystal layer, the alignment directions are simultaneously aligned throughout the full surface, and the response time can be improved.

In the liquid crystal display device according to the embodiment, substrates for constituting an MVA mode liquid crystal display device have a construction in which transparent pixel electrodes having protrusive structures or slits are formed on the surface of at least one of the substrates, alignment control layers for aligning the major axis direction of the liquid crystal molecules substantially vertically to the substrate surface are disposed on the surface of at least one substrates, and at least one of the alignment control layers is not subjected to alignment treatment.

The liquid crystal display device according to the embodiment stipulates a substrate structure for controlling the liquid crystal layer.

A production method of a liquid crystal display device according to the embodiment stipulates the concentration of the photo-curing composition so that the major axis direction of the liquid crystal molecules contained in the liquid crystal layer satisfies the following relation with a pre-tilt direction and a polar angle direction of the liquid crystal skeletal structure as other parameters. In other words, when the voltage applied to the liquid crystal layer is 0 V:

When dielectric anisotropy of liquid crystal molecules is negative:

$$\alpha < \theta < (\beta 1 + \beta 2)/2$$

When dielectric anisotropy of liquid crystal molecule is positive:

$$(\beta 1 + \beta 2)/2 < \theta < \alpha$$

Further, preferably, there are the following two cases:

When dielectric anisotropy of liquid crystal molecule is negative:

$$(\beta 1 + \beta 2)/2 - \theta < \theta - \alpha$$

When dielectric anisotropy of liquid crystal molecule is positive:

$$\theta - (\beta 1 + \beta 2)/2 < \alpha - \theta$$

The invention according to the embodiment stipulates the condition for determining the concentration of the photo-curing composition so that the tilt angle of the liquid crystal skeletal structures and the tilt angle of the liquid crystal molecules, that varies depending on the amount of the liquid crystal skeletal structures, fall within a predetermined range, and improves the response speed of the liquid crystal molecules throughout the whole display region.

EXAMPLE

To improve the response speed in the MVA mode, it is necessary to make the time required for the propagation of the inclination zero and to simultaneously incline the whole surface of the display region. To accomplish this simultaneous inclination of the whole surface, it is extremely effective to keep the liquid crystal molecules inclined relative to the substrate interface throughout the whole surface under the voltage non-application state. However, no concrete means applicable to the MVA mode has been clarified to this date.

As a result of intensive trials, it has found that the drastic improvement of the response speed by the whole surface simultaneous inclination can be accomplished by forming a photo-cured product of a photo-curing composition having a liquid crystal skeletal structure in a liquid crystal layer under the state where the liquid crystal skeletal structure is inclined relative to substrates.

Figure 2:
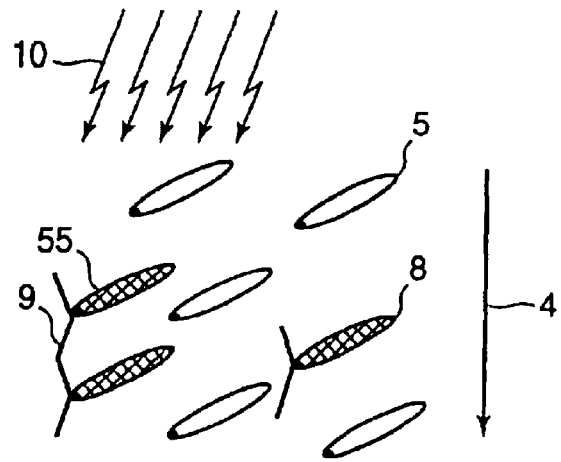
FIG. 2 shows formation of a photo-cured product.
Figure 3:
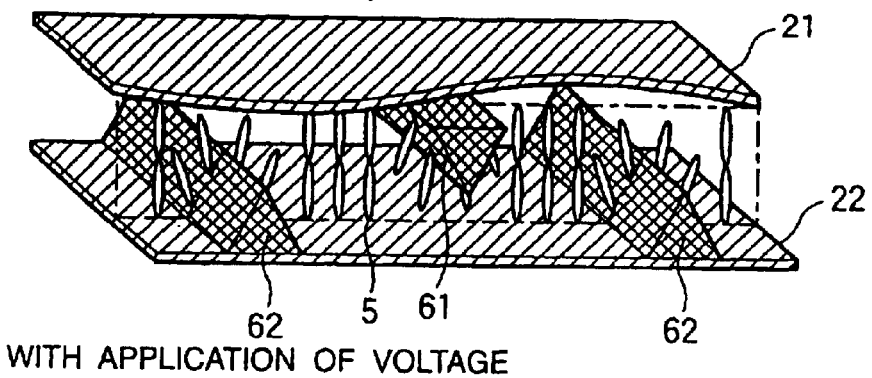
FIG. 3 is a conceptual view of an MVA mode liquid crystal display device.
Figure 3:
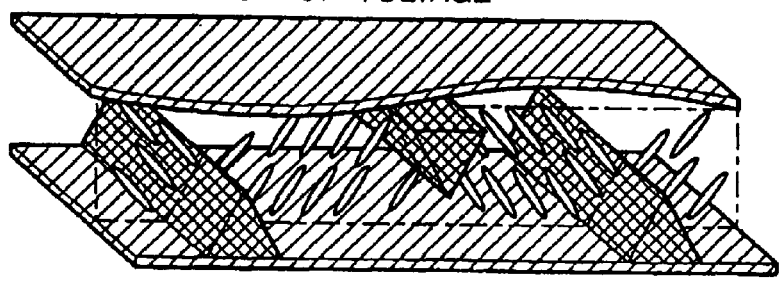

FIG. 2 shows a mode of formation of a photo-cured product. Reference numeral 4 in the drawing denotes an electric field generated by a voltage applied to a liquid crystal. Reference numeral 5 denotes liquid crystal molecules. Reference numeral 8 denotes a liquid crystal monomer. Reference numeral 9 denotes a main chain. Reference numeral 10 denotes ultraviolet rays. Reference numeral 55 denotes a liquid crystal skeletal structure. The liquid crystal and the liquid crystal monomer are mixed, a voltage is applied till maximum transmission factor can be obtained, and an electric field is generated in the liquid crystal.

As a result, the liquid crystal molecules having negative dielectric anisotropy and the liquid crystal monomer are inclined to a certain angle. The liquid crystal monomer 8 as the photo-curing composition having the liquid crystal skeletal structure are photo-polymerized and cured by using the ultraviolet rays 10. As a result, the liquid crystal skeletal structure 55 continuing the main chain 8 is fixed while inclined in a predetermined direction. There is thus obtained a photo-cured product.

The first example of the present invention will be given below. Pixel electrodes each having a TFT transistor, and protrusive structures, are formed on one of the substrates. A common electrode and protrusive structures are formed on the other substrate. A liquid crystal monoacrylate monomer UCL-001-K1, a product of Dai-Nippon Ink Co., is added to a liquid crystal MJ·961213, a product of Merck Japan Ltd., and the mixture is charged between two glass substrates. After the mixture is charged, the ultraviolet rays are irradiated while a voltage is being applied. A cured MVA panel is fabricated under the state where the liquid crystal skeletal structure is at about 30 degrees to the substrate surface in the display region.

Here, a polyamic acid material JALS-684, a product of JSR Corp., is used for the alignment film. Protrusive structures having a height of 1.5 $\mu$m and a width of 10 $\mu$m are formed on both upper and lower substrates with gaps of 37.5 $\mu$m among them by using a resist LC·200, a product of Shipley Co. A cell thickness is 4.0 $\mu$m.

Figure 6:
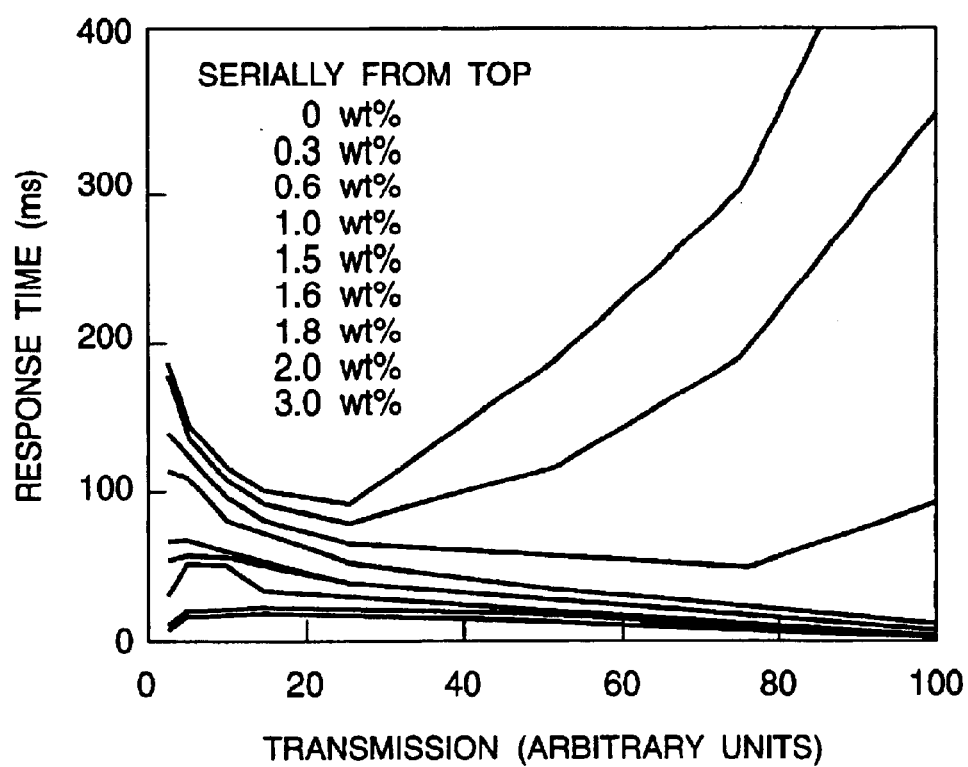
FIG. 6 shows dependence of a response time on a monomer addition amount.

FIG. 6 shows a measurement result of the response time of the liquid crystal molecules by using the addition amount of the liquid crystal skeletal structure monomer as a parameter. A slight improvement of the response time starts appearing from the addition amount of 0.3 wt % in this graph. It can be also appreciated from the graph that the addition amount of about 1.0 wt % is necessary to strongly restrict the inclination direction on the high voltage side, too. The value starts saturating at about 2.0 wt %.

Figure 7:
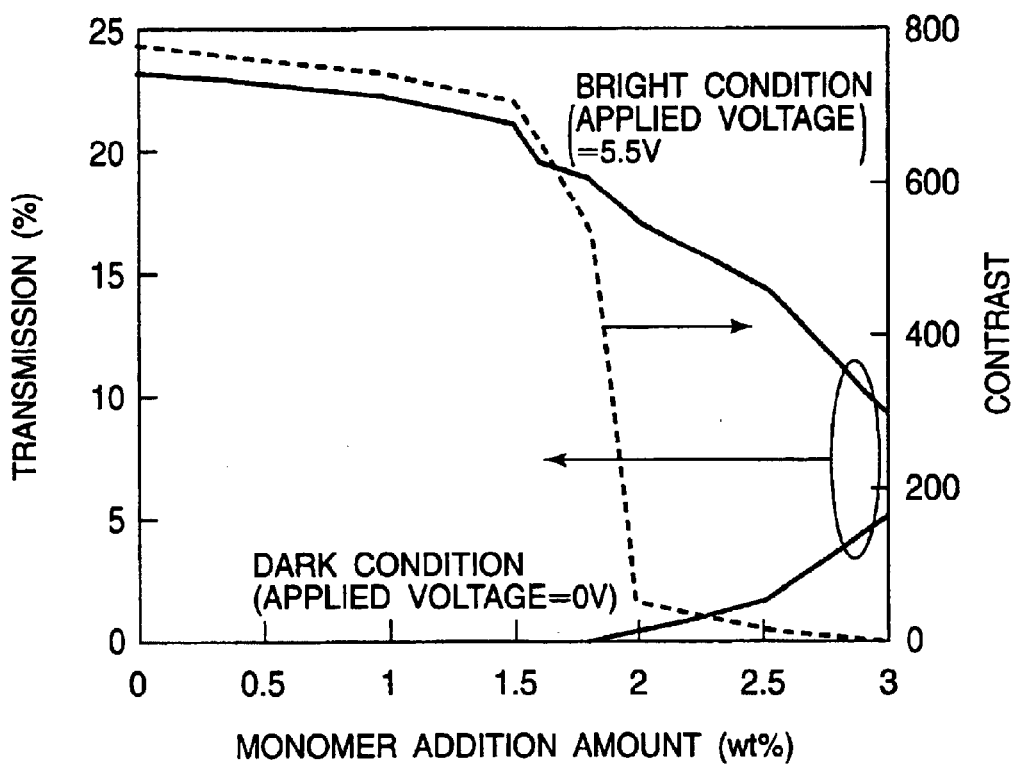
FIG. 7 shows dependence of contract on a monomer addition amount.

FIG. 7 shows an absolute transmission factor and contrast relative to the addition amount of the monomer measured simultaneously with the measurement of FIG. 6. In the graph, solid line represents the transmission factor under a bright state (applied voltage: 5.5 V) and under a dark condition (applied voltage: 0 V). Dotted line represents the contrast. Both transmission factor and contrast keep high values when the addition amount is up to 1.5 wt %, but contrast drops drastically at 2.0 wt %. Almost all liquid crystal molecules are aligned in the direction of the liquid crystal skeletal structure and large scattering is observed at 3.0 wt %.

A low concentration of the liquid crystal monomer (photo-cured product) of from 0.3 to 1.5 wt % may be applied to the application where gradation is of importance and a high concentration of 1.5 to 3.0 wt % may be applied to the fields where the response speed is of importance.

Figure 8:
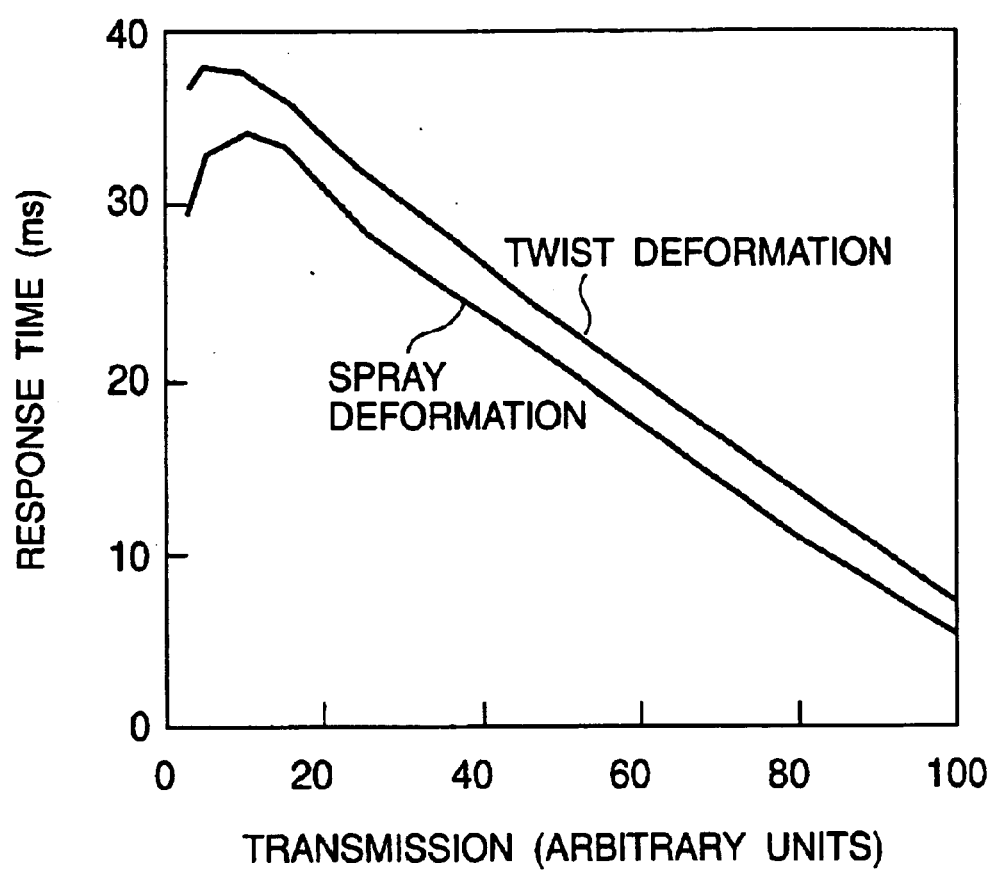
FIG. 8 shows a change of a response time depending on existence/absence of twist deformation.

In the second example of the present invention, rubbing treatment is applied to the surfaces of the upper and lower alignment films by using the same liquid crystal material, the same alignment film material and the same monomer material as those of the first example. After the liquid crystal mixture is charged, the ultraviolet rays are irradiated while a voltage is being applied. The liquid crystal mixture is cured when the liquid crystal skeletal structure reaches about 30 degrees relative to the substrate surface in the display region, thereby giving a panel. Here, the addition amount is 2.0 wt % and the rubbing treatment is conducted in the following two ways, that is, rubbing anti-parallel between the upper and lower substrates and rubbing while its direction is deviated by 90 degrees. The cell thickness is 4.0 μm. The result is shown in FIG. 8. The response tome is longer in the panel in which rubbing is conducted by deviating the rubbing direction by 90 degrees.

The 90 degrees deviation corresponds to twist deformation, and anti-parallel corresponds to spray deformation. In this way, deformation of the liquid crystal layer is limited to spray or bend other than twist.

The third example of the present invention uses a MVA panel in which materials used, formation condition of the protrusive structures and the cell thickness are the same as those of the first example. However, the angle of the liquid crystal skeletal structure at the time of curing and the mean tilt angle of the liquid crystal molecules are changed, and the alignment condition and the degree of scattering due to the polymer are examined. Here, the mean tilt angle of the liquid crystal molecules is changed through the addition amount of the monomer, and the angle value is calculated from the transmission at the time of voltage non-application.

Table 1 tabulates the result. Here, $\beta=(\beta 1+\beta 2)/2$. A good alignment/scattering state can be obtained when the limit angle ($\beta$), the tilt angle of the liquid crystal molecules ($\theta$) and the tilt angle of the liquid crystal skeletal structure ($\alpha$) satisfy the following relation:

$$\beta-\theta<\theta-\alpha$$

When the tilt angle of the liquid crystal molecules departs from the alignment film limit angle and comes close to the tilt angle of the liquid crystal skeletal structure, the alignment/scattering state gets deteriorated. For, when the addition amount of the monomer is increased, scattering by the polymer formed in the cell strongly appears and at the same time, the director of the liquid crystal molecules is disturbed during the formation of the polymer.

TABLE 1

Angles of liquid crystal skeletal structure and liquid crystal molecules, and alignment/scattering condition

| $\beta$ | $\alpha$ | $\theta$ | $\beta-\theta<$ $\theta-\alpha$ | Alignment | Scattering |
| --- | --- | --- | --- | --- | --- |
| 90 | 80 | 89 | < | O | O |
| 90 | 80 | 88 | < | O | O |
| 90 | 80 | 83 | > | x | x |
| 90 | 60 | 89 | < | O | O |
| 90 | 60 | 85 | < | Δ | Δ |
| 90 | 60 | 70 | > | x | x |
| 90 | 30 | 89 | < | O | O |
| 90 | 30 | 60 | = | x | x |
| 90 | 30 | 40 | > | x | x |

(Note)
O: alignment: fair, scattering: nil
Δ: alignment: rather bad, scattering: some extent
x: alignment: bad, scattering: many The present invention can simultaneously incline liquid crystal molecules in the display region as a whole, can improve response of the liquid crystal molecules to the electric field and can accomplish extremely high-speed response at all gradations while keeping the excellent alignment condition.

What is claimed is:

1. A liquid crystal display device comprising:
   a pair of substrates including a first substrate having pixel electrodes, active devices and an alignment film, and a second substrate having an opposing electrode and an alignment film; and
   a liquid crystal layer containing nematic liquid crystal molecules and a cured-product formed three-dimensionally of a composition having a liquid crystal skeletal structure, and sandwiched between the pair of substrates;
   wherein deformation of the liquid crystal layer is at least spray deformation or bend deformation and,
   the concentration of the composition is determined so as to satisfy the following relation when a mean value of an angle described between the liquid crystal skeletal structure and the first substrate in a polar angle direction is $\alpha$, pre-tilt angles of the liquid crystal molecules on interfaces of the first and second substrates are $\beta 1$ and $\beta 2$, respectively, and a mean value of an angle between the liquid crystal molecules and the first substrate is $\theta$:
   at the time of non-application of a voltage;
   when dielectric anisotropy of the liquid crystal molecules is negative, $\alpha<\theta<(\beta 1+\beta 2)/2$; and
   when dielectric anisotropy of the liquid crystal molecules is positive, $(\beta 1+\beta 2)/2<\theta<\alpha$.

2. A liquid crystal display device comprising:
   a pair of substrates including a first substrate having pixel electrodes, active devices and an alignment film, and a second substrate having an opposing electrode and an alignment film; and
   a liquid crystal layer containing nematic liquid crystal molecules and a cured-product formed three-dimensionally of a composition having a liquid crystal skeletal structure, and sandwiched between the pair of substrates;

wherein deformation of the liquid crystal layer is at least spray deformation or bend deformation, and a concentration of the composition is from 0.3 to 3 wt % and satisfies the following relation when a mean value of an angle described between the liquid crystal skeletal structure and the first substrate in a polar angle direction is $\alpha$, pre-tilt angles of the liquid crystal molecules on interfaces of the first and second substrates are $\beta1$ and $\beta2$, respectively, and a mean value of an angle between the liquid crystal molecules and the first substrate is $\theta$:

at the time of non-application of a voltage;

when dielectric anisotropy of the liquid crystal molecules is negative, $\alpha<\theta<(\beta1+\beta2)/2$; and when dielectric anisotropy of the liquid crystal molecules is positive, $(\beta1+\beta2)/2<\theta<\alpha$.

3. A liquid crystal display device according to claim 2, wherein at least one of the substrates of the pair of substrates has slits of electrodes or protrusions, and at least one of the substrates of the pair of substrates has the alignment film for aligning a major axis direction of the liquid crystal molecules substantially vertically to a surface of the substrate.

4. A liquid crystal display device comprising:

a pair of substrates including a first substrate having pixel electrodes, active devices and an alignment film, and a second substrate having an opposing electrode and an alignment film; and a liquid crystal layer containing nematic liquid crystal molecules and a cured-product formed three-dimensionally of a composition having a liquid crystal skeletal structure, and sandwiched between the pair of substrates;

wherein deformation of the liquid crystal layer is at least spray deformation or bend deformation, and a concentration of the composition is from 0.3 to 3 wt % and satisfies the following relation when a mean value of an angle described between the liquid crystal skeletal structure and the first substrate in a polar angle direction is $\alpha$, pre-tilt angles of the liquid crystal molecules on interfaces of the first and second substrates are $\beta1$ and $\beta2$, respectively, and a mean value of an angle between the liquid crystal molecules and the first substrate is $\theta$:

at the time of non-application of a voltage;

when dielectric anisotropy of the liquid crystal molecules is negative, $(\beta1+\beta2)/2-\theta<\theta-\alpha$; and when dielectric anisotropy of the liquid crystal molecules is positive, $\theta-(\beta1+\beta2)/2<\alpha-\theta$.

5. A liquid crystal display device according to claim 4, wherein at least one of the substrates of the pair of substrates has slits of electrodes or protrusions, and at least one of the substrates of the pair of substrates has the alignment film for aligning a major axis direction of the liquid crystal molecules substantially vertically to a surface of the substrate.

6. A liquid crystal display device comprising:

a pair of substrates including a first substrate having pixel electrodes, active devices and an alignment film, and a second substrate having an opposing electrode and an alignment film; and a liquid crystal layer containing nematic liquid crystal molecules and a cured-product formed three-dimensionally of a composition having a liquid crystal skeletal structure, and sandwiched between the pair of substrates; and wherein deformation of the liquid crystal layer is at least spray deformation or bend deformation, and the concentration of the composition is determined so as to satisfy the following relation when a mean value of an angle described between the liquid crystal skeletal structure and the first substrate in a polar angle direction is $\alpha$, pre-tilt angles of the liquid crystal molecules on interfaces of the first and second substrates are $\beta1$ and $\beta2$, respectively, and a mean value of an angle between the liquid crystal molecules and the first substrate is $\theta$:

at the time of non-application of a voltage;

when dielectric anisotropy of the liquid crystal molecules is negative, $(\beta1+\beta2)/2-\theta<\theta-\alpha$; and when dielectric anisotropy of the liquid crystal molecules is positive, $\theta-(\beta1+\beta2)/2<\alpha-\theta$.

7. A method for producing a liquid crystal display device having a pair of substrates including a first substrate having pixel electrodes, active devices and an alignment film, and a second substrate having an opposing electrode and an alignment film; and a liquid crystal layer containing nematic liquid crystal molecules and a cured-product formed three-dimensionally of a composition having a liquid crystal skeletal structure, and sandwiched between the pair of substrates, wherein deformation of the liquid crystal layer is at least spray deformation or bend deformation, the method comprising:

determining the concentration of the composition so as to satisfy the following relation when a mean value of an angle described between the liquid crystal skeletal structure and the first substrate in a polar angle direction is $\alpha$, pre-tilt angles of the liquid crystal molecules on interfaces of the first and second substrates are $\beta1$ and $\beta2$, respectively, and a mean value of an angle between the liquid crystal molecules and the first substrate is $\theta$:

at the time of non-application of a voltage;

when dielectric anisotropy of the liquid crystal molecules is negative, $\alpha<\theta<(\beta1+\beta2)/2$; and when dielectric anisotropy of the liquid crystal molecules is positive, $(\beta1+\beta2)/2<\theta<\alpha$.

8. A method of producing a liquid crystal display device having a pair of substrates including a first substrate having pixel electrodes, active devices and an alignment film, and a second substrate having an opposing electrode and an alignment film; and a liquid crystal layer containing nematic liquid crystal molecules and a cured-product formed three-dimensionally of a composition having a liquid crystal skeletal structure, and sandwiched between the pair of substrates, and wherein deformation of the liquid crystal layer is at least spray deformation or bend deformation, the method comprising:

determining the concentration of the composition so as to satisfy the following relation when a mean value of an angle described between the liquid crystal skeletal structure and the first substrate in a polar angle direction is $\alpha$, pre-tilt angles of the liquid crystal molecules on interfaces of the first and second substrates are $\beta1$ and $\beta2$, respectively, and a mean value of an angle between the liquid crystal molecules and the first substrate is $\theta$:

at the time of non-application of a voltage;

when dielectric anisotropy of the liquid crystal molecules is negative, $(\beta1+\beta2)/2-\theta<\theta-\alpha$; and when dielectric anisotropy of the liquid crystal molecules is positive, $\theta-((\beta1+\beta2)/2<\alpha-\theta$.

* * * * *

UNITED STATES PATENT AND TRADEMARK OFFICE
CERTIFICATE OF CORRECTION

PATENT NO. : 6,903,796 B2 Page 1 of 1
APPLICATION NO. : 09/898340
DATED : June 7, 2005
INVENTOR(S) : Shingo Kataoka It is certified that error appears in the above-identified patent and that said Letters Patent is hereby corrected as shown below:

On the title page:

Under References Cited - Foreign Patent Documents, insert the following references: --JP 11-295740 * 10/1999-- --EP 0 768 562 * 4/1997--.

Figure 4:
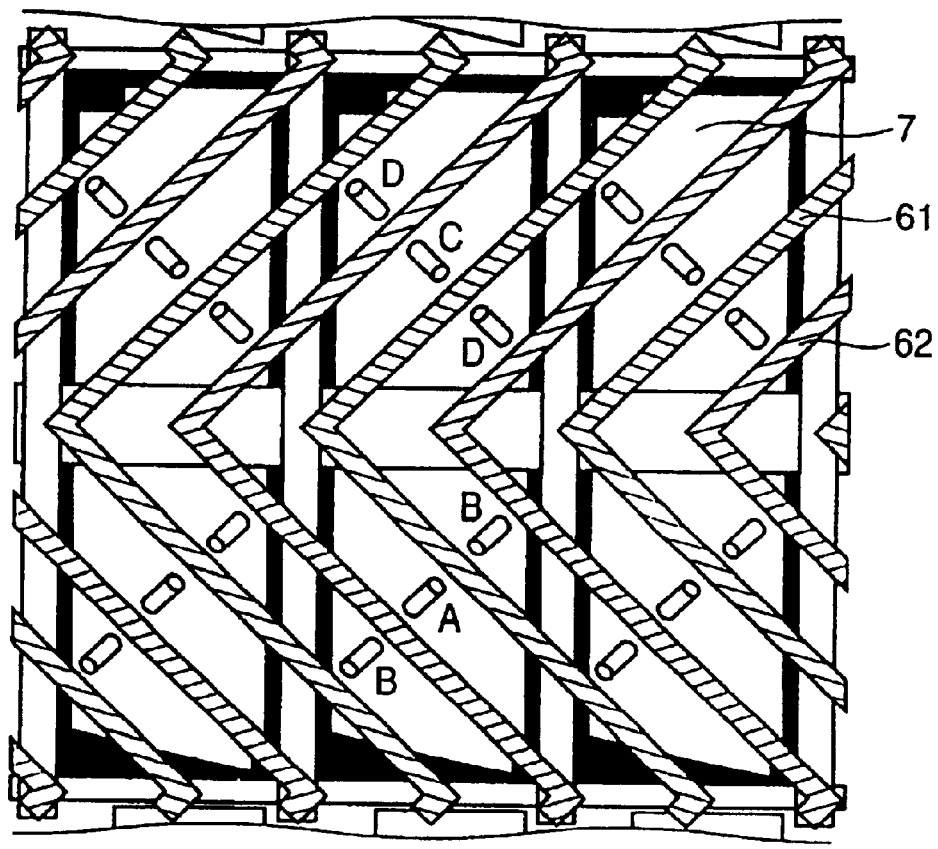
FIG. 4 shows a tilt direction of liquid crystal molecules.
Figure 4:
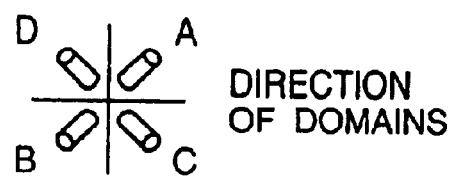
Figure 5:
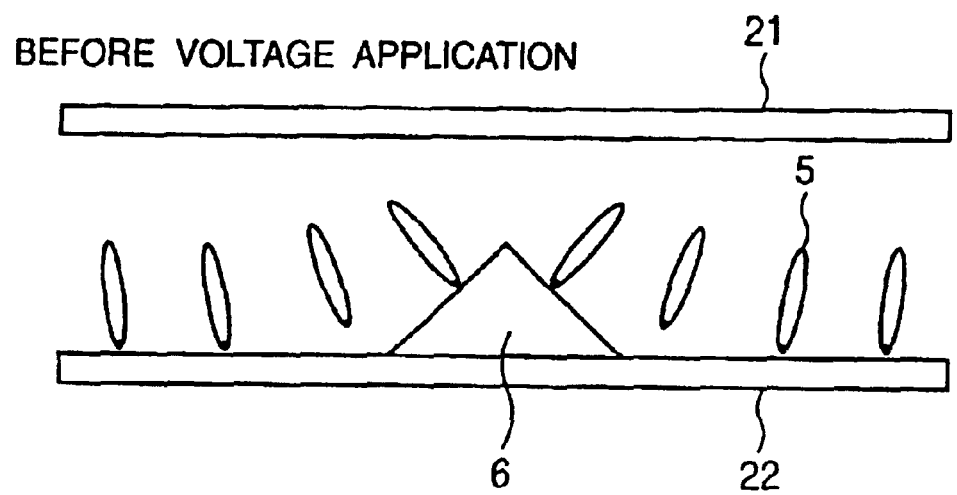
FIG. 5 shows inclination propagation of liquid crystal molecules.
Figure 5:
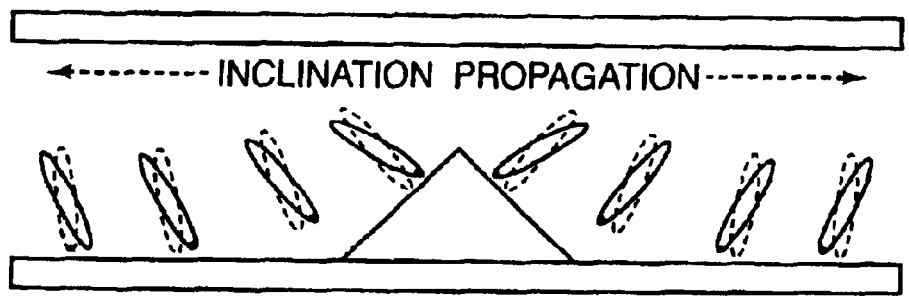

In the Drawings:

Figs. 4 and 5, insert --PRIOR ART-- into each figure legend.

Signed and Sealed this

Twenty-fourth Day of April, 2007

JON W. DUDAS
*Director of the United States Patent and Trademark Office*